(12) United States Patent
Aziz et al.

(10) Patent No.: US 6,814,454 B2
(45) Date of Patent: Nov. 9, 2004

(54) ACHROMATIC BEAM SWITCH

(75) Inventors: David J. Aziz, Sunnyvale, CA (US); Andrey Klishin, Foster City, CA (US); Martin D. Andrews, Menlo Park, CA (US)

(73) Assignee: Molecular Devices Corporation, Sunnyvale, CA (US)

(*) Notice: Subject to any disclaimer, the term of this patent is extended or adjusted under 35 U.S.C. 154(b) by 0 days.

(21) Appl. No.: 10/280,402

(22) Filed: Oct. 25, 2002

(65) Prior Publication Data

US 2004/0080842 A1 Apr. 29, 2004

(51) Int. Cl.$^7$ ................................................ G02B 5/08
(52) U.S. Cl. ....................................................... 359/857
(58) Field of Search ................................ 359/201, 212, 359/640, 831, 833, 834, 836, 857

(56) References Cited

U.S. PATENT DOCUMENTS

| | | | |
|---|---|---|---|
| 4,281,339 A | 7/1981 | Morishita et al. | 358/52 |
| 4,531,054 A | 7/1985 | Suzuki | 250/201 |
| 5,926,283 A | 7/1999 | Hopkins | 356/419 |
| 6,003,997 A | 12/1999 | Downes, Jr. | 359/857 |
| 6,038,076 A * | 3/2000 | Bouzid et al. | 359/640 |
| 6,501,061 B1 * | 12/2002 | Kitai et al. | 250/205 |

OTHER PUBLICATIONS

Guyer, Robert C., "Optical Alignment Mechanisms," SPIE's International Symposium on Optical Science and Technology, Jul. 29, 2001–Aug. 3, 2001.

* cited by examiner

Primary Examiner—Euncha P. Cherry
(74) Attorney, Agent, or Firm—Antonio R. Durando; Quarles & Brady Streich Lang, LLP

(57) ABSTRACT

A light source with multiple parallel beams is combined with a pair of opposing mirrors mounted on a rotating fixture and with a fixed aperture to produce a single output beam. Through the motion of the rotating fixture, the pair of mirrors shifts the location of the output of each input beam passing through the device so as to sequentially channel each beam into the optical path defined by the aperture. Thus, the input source corresponding to the output beam may be quickly switched by rotating the pair of mirrors to the position that produces the appropriate shift of the beam selected from the light source. In another embodiment of the invention, the pair of opposing mirrors is replaced by a transparent block similarly mounted on a rotating fixture.

21 Claims, 16 Drawing Sheets

ACHROMATIC BEAM SWITCH

BACKGROUND OF THE INVENTION

1. Field of the Invention

This invention pertains to the general field of optical beam switches and controllers. In particular, the invention provides a simple mechanism for switching any one of a number of parallel beams onto a common optical path.

2. Description of the Prior Art

In optical applications, it is often the case that a beam of particular chromatic or power characteristics is needed among several available choices for use in an optical system. For example, different wavelengths may be preferred for alternative applications, such as multiple laser sources used sequentially in a microarray scanner. Spatially different wavefronts may similarly be desirable, such as beams with varied cross-sectional diameters. In all such cases, some mechanism is provided for selecting the output beam by switching from one input beam to another.

Typically, such switching is accomplished using dichroic beamsplitters. All input beams are reflected into a single optical axis and the dichroic beamsplitters are used to control the wavelength of the output beam, as desired, by energizing a single input beam at a time. This requires the use of multiple dichroic elements, each of which introduces undesirable intensity losses, as well as the sequential energizing and deenergizing of the various light sources, or, in the case of sources that are not efficiently turned on and off, the use of shutters or equivalent mechanisms that add to the cost of the switch. Accordingly, a simpler mechanism for switching between alternative light sources would be a desirable advance in the art.

It is known that a parallel glass plate will translate an incident beam along an axis parallel to the incident optical axis by an amount that depends on the distance between the parallel surfaces in the plate, the index of refraction of the glass, and the angle of incidence of the beam. This property is often used to correct the optical axis position in optical apparatus. As illustrated in FIG. 1, the property can also be used to shift the position of the output beam among parallel alternatives simply by varying the position, and therefore the angle of incidence, of the input beam.

As illustrated in FIG. 2, it is also clear that two reflective surfaces in fixed parallel relation to one another will translate an incident beam along an axis parallel to the incident optical axis by an amount that depends on the distance between the reflective surfaces. Accordingly, this property can similarly be used to shift the position of the output beam among parallel alternatives simply by varying the distance between the surfaces or, equivalently, by rotating the two mirrors while maintaining their relative position (thereby changing the distance traveled between them by the beam after first reflection). The present invention exploits these properties to provide a simple but effective switching mechanism for directing a beam selected from alternative parallel input choices toward a predetermined output optical axis.

BRIEF SUMMARY OF THE INVENTION

The preferred embodiment of the invention consists of the combination of a light source with multiple parallel beams, a pair of opposing mirrors mounted on a rotating fixture, and an aperture defining the optical path of a single output beam. Through the motion of the rotating fixture, the two mirrors shift the location of the output of each input beam reflected by the mirrors so as to selectively channel each beam into the optical path defined by the aperture. Accordingly, the input source corresponding to the output beam may be quickly switched by rotating the fixture/mirror combination to the position that produces the appropriate shift of the beam selected from the light source. Thus, the rotating fixture/mirror combination acts as a switch among the various alternative light sources to produce the desired output beam through the aperture.

According to another embodiment of the invention, the pair of reflective surfaces is replaced by a transparent block similarly mounted on a rotating fixture. Through the motion of the rotating fixture, the transparent block shifts the location of the output of each input beam so as to selectively channel each beam into the optical path defined by the aperture, thereby also acting as an optical switch.

Thus, a benefit derived from the invention is the controllable translation of an optical beam to a position parallel to its propagation axis, which allows the placement of multiple parallel optical beams, one at a time, onto a common optical axis for introduction into an optical system.

Another benefit of the invention is its ability to shift a light beam, whether through reflection or diffraction, without chromatic effects. Because the translation is a function of the rotation angle of the fixture, it can be finely adjusted to compensate for any wavelength-dependent behavior of the device components.

The invention provides the benefit of negligible losses when compared to the serial dichroic beamsplitters used in the prior art. Furthermore, it provides the advantage of a performance that is not substantially limited by the spectral properties of the input beams.

Finally, a further benefit of the invention lies in its general application as a switch in any optical instrument that requires the ability to select one of alternative parallel light beams for use in the single optical path of an optical system.

Various other benefits and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

DETAILED DESCRIPTION OF THE INVENTION

The heart of the invention lies in the recognition that the shifts produced by pairs of opposing surfaces having fixed relative orientation through refraction or reflection of incident beams can be exploited advantageously to produce a simple and efficient optical switch. Accordingly, the invention consists of combining a rotating mechanism with such pair of opposing surfaces so as to enable the selective channeling of any one of multiple parallel light sources into a predetermined single optical path toward an optical system.

For the purposes of this disclosure, unless clearly directed to specific different applications, the terms "input" and "output" are used with reference to the rotating fixture of the invention. Thus, input beams are those incident to the fixture, and output beams are those emergent from the fixture. The term "opposing surfaces" refers to surfaces (which may be reflective or refractive) facing one another in fixed relative orientation, such that an incident wavefront is shifted by reflection and/or refraction with respect to its initial optical path. "Opposing" does not necessarily imply "parallelism"; it only means that the light travels between the surfaces. The modifier "direction-altering," as applied to an optical element or surface, is intended to refer to either a reflective or a refractive optical surface. The terms "source" and "sources" are used interchangeably to refer to the plurality of parallel light beams that constitute the input to the switch of the invention. With reference to input light beams, "substantially" parallel is intended to mean parallel within the tolerance of the optical system downstream of the switch. Finally, the term "aperture" is intended to refer to any structure or optical element, such as a diaphragm, containing an aperture limiting the flow of energy.

Figure 1:
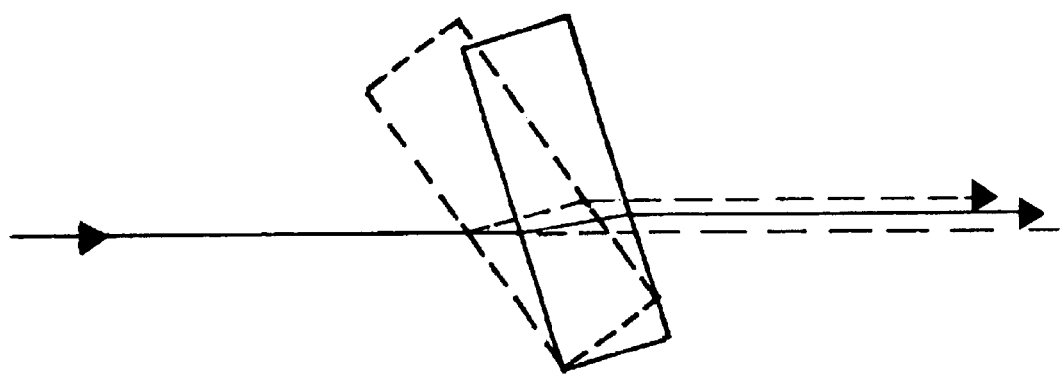
FIG. 1 is a schematic representation of the lateral shift produced by a glass block on an incident light beam.
Figure 2:
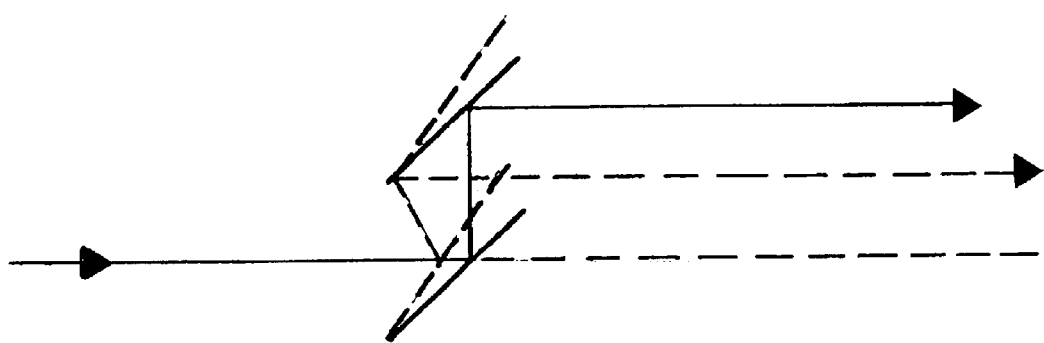
FIG. 2 is a schematic representation of the lateral shift produced by a pair of opposing mirrors on an incident light beam.
Figure 3:
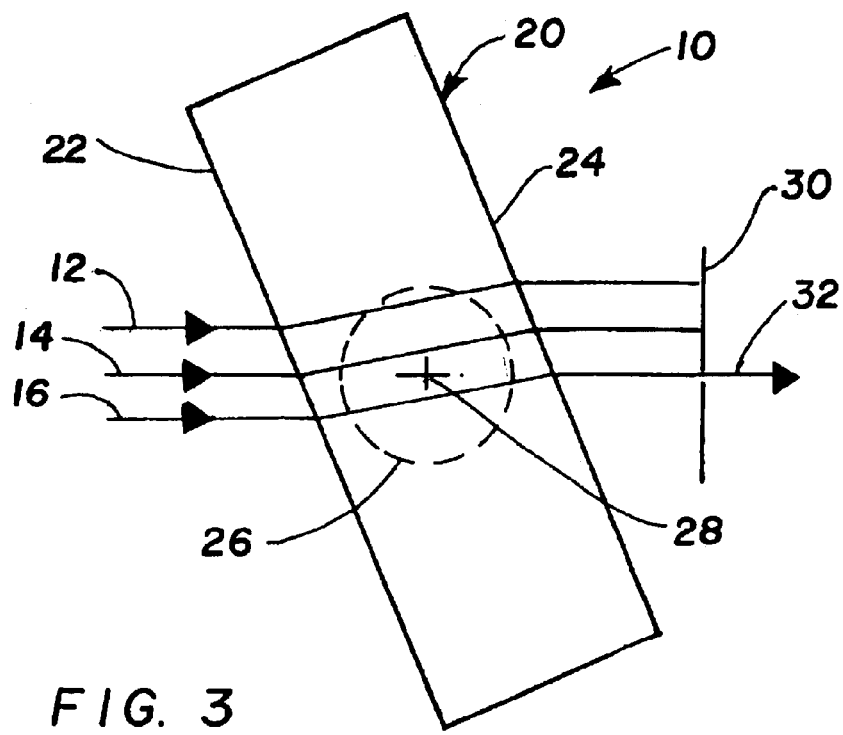
FIG. 3 is a schematic illustration of an optical switch according to the invention that utilizes a parallel glass plate mounted on a rotating fixture to determine the output of the switch by selectively shifting several incident light beams onto a fixed optical path through an aperture.
Figure 4:
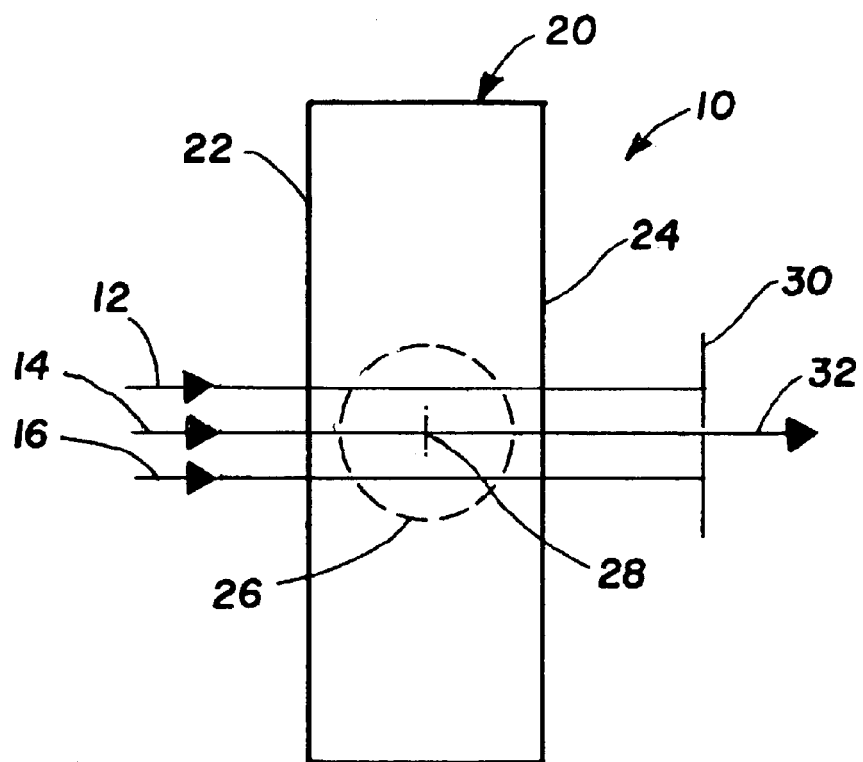
FIGS. 4 and 5 show different positions of the plate in the switch of FIG. 3 to illustrate the selection of different input beams to produce the output of the switch.
Figure 5:
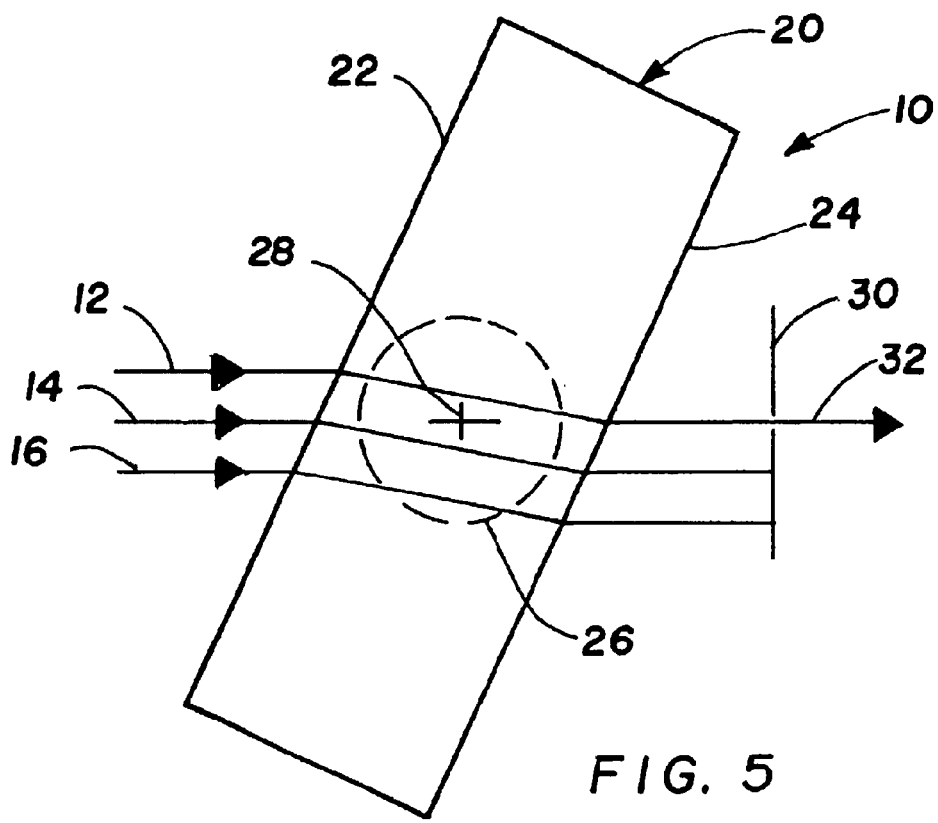

Referring to the drawings, wherein like symbols and numerals are used throughout to point to like parts, FIGS. 3–5 illustrate the simplest embodiment of an optical switch 10 according to the present invention. A light source includes a plurality of substantially parallel light beams (three beams 12, 14, 16 are shown for illustration) with varied properties, such as different wavelengths, different intensities, or different diameters. The optical path of each beam is directed toward a plane parallel plate of glass 20, which is disposed with an entrance face or surface 22 (a direction-altering element, as defined herein) facing the light source and an opposing exit surface 24 facing the opposite output direction. The plate 20 is mounted on a fixture 26 adapted to rotate it around an axis 28 that is preferably parallel to the two opposing surfaces 22, 24.

It is noted that the opposing surfaces 22, 24 do not need to be parallel to one another unless a parallel beam shift is desired. In all other (non-parallel) cases, the light beams are shifted toward a different direction that depends on the relative position of the two surfaces 22, 24 and their orientation with respect to the incident beams 12, 14, 16.

Each incident beam 12, 14, 16 is refracted at the entrance and exit faces of the plate 20, and translated laterally as a function of the thickness, angle, and refractive index of the plate. As illustrated by the sequence of positions seen in FIGS. 3–5, each beam's translation is controlled by rotating the plate 20 around the axis of rotation 28 normal to the plane of the figures. The output of each beam from the exit surface 24 is shifted downward as the plate 20 is turned clockwise, thereby changing its position with respect to a fixed target. According to the invention, an aperture 30 placed in fixed relation to the light source is used to alternatively select a single emergent beam 32 as the output of the optical switch 10.

FIG. 3 shows the plate position that causes the incident beam 16 to be shifted to the optical path passing through the aperture 30. FIG. 4 shows the case where the output beam 32 corresponds to the input beam 14. Similarly, FIG. 5 illustrates the plate position that shifts the incident beam 12 onto the optical path of the output of the switch 10. Some losses will occur due to partial reflection of the beams 12, 14, 16 at the entrance and exit faces 22, 24. Accordingly, this design may not be preferred for a combination of beams with substantial wavelength and/or polarization characteristics, or in the case where substantial angular range (e.g., >±30 degrees) is required, exceeding the capability of typical anti-reflection coatings. Dispersion (wavelength dependent refractive index) in the glass will affect the refraction angle of different color beams, but this can be accommodated by small adjustments in the angle of rotation introduced by the fixture 26.

Figure 6:
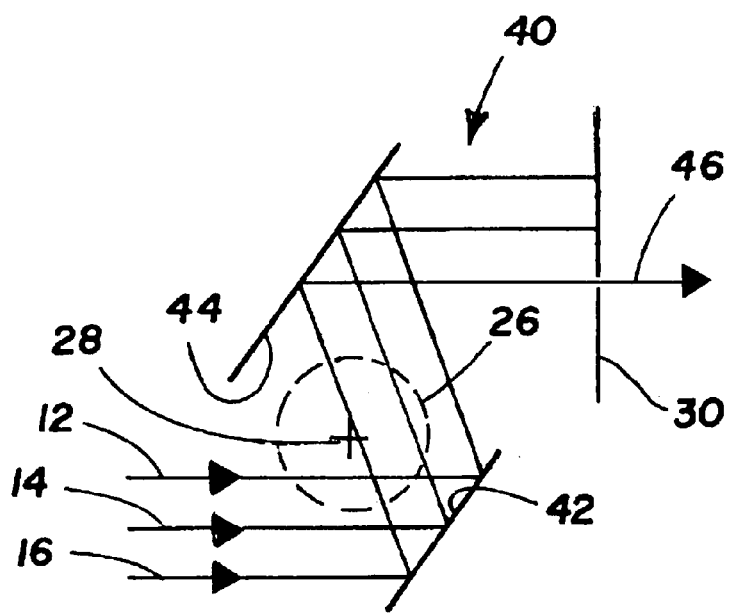
FIG. 6 is a schematic illustration of an optical switch according to the invention that utilizes two parallel mirrors mounted on a rotating fixture to determine the output of the switch by selectively shifting several incident light beams onto a fixed optical path through an aperture.
Figure 7:
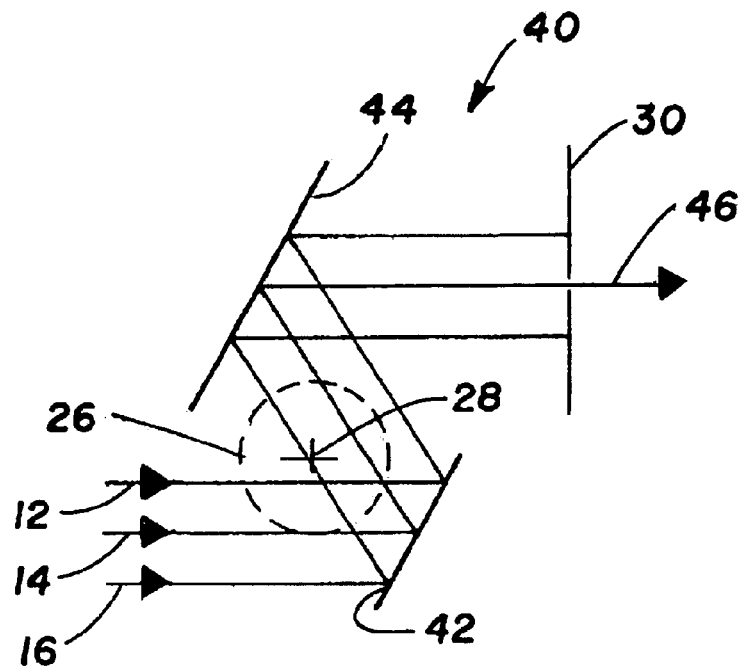
FIGS. 7 and 8 show different positions of the mirrors in the switch of FIG. 6 to illustrate the selection of different input beams to produce the output of the switch.
Figure 8:
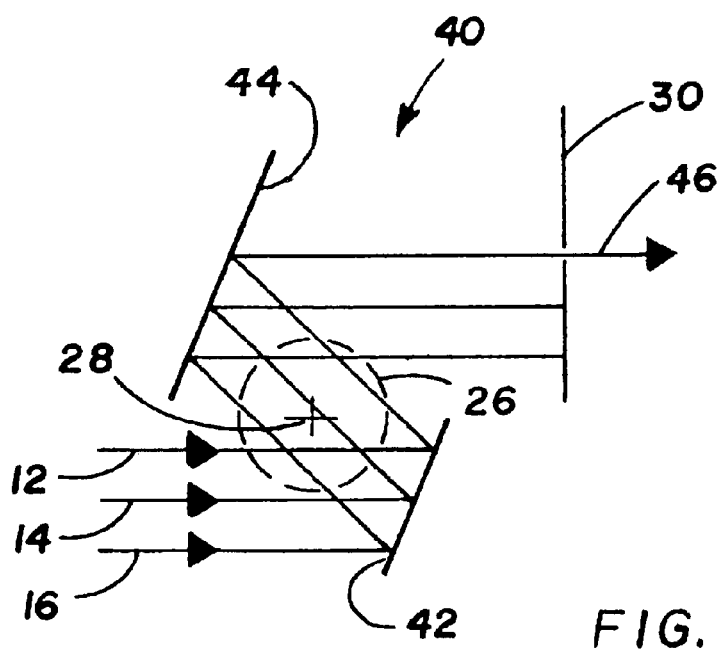

An alternate, generally preferred embodiment of the invention is illustrated in FIGS. 6–8. While the concept of the invention is the same, the optical switch 40 utilizes reflective surfaces (another type of direction-altering elements) instead of glass blocks. Using three parallel beams 12, 14, 16 again for illustration, each beam is directed toward a first reflective surface 42 facing the light source. A second reflective surface 44 is placed facing the first mirror 42 and in a parallel position adapted to receive the reflection of each incident beam 12, 14, 16 from the first mirror and in turn reflect it forward in a direction parallel to its original path. The pair of mirrors 42,44 is mounted on a fixture 26 adapted to rotate the mirrors around an axis 28 that is preferably parallel to the two opposing reflective surfaces 42,44 of the mirrors. The two mirrors 42, 44 are fixed with respect to each other and form an assembly that rotates as a unit.

According to this embodiment of the invention, each incident beam 12, 14, 16 is reflected twice by the parallel opposing surfaces 42, 44 and is translated laterally as a function of the distance between the mirrors and the angle of incidence of the beams. As illustrated by the sequence of positions seen in FIGS. 6–8, each beam's translation is controlled by rotating the mirror assembly 42,44 around the axis of rotation 28 (also shown as normal to the plane of the figures). The reflection of each beam from the second mirror 44 is shifted downward as the mirror assembly 42,44 is turned counterclockwise, thereby changing the beam position with respect to the aperture 30 placed in fixed relation to the light source. Thus, the aperture 30 enables the alternative selection of a single reflected beam 46 as the output of the optical switch 40.

Inasmuch as reflection angles are wavelength independent and reflective coatings are readily available for wide spectral and angle ranges, this embodiment provides great flexibility of application. It is noted that the rotation of the mirror assembly (or the glass plate, in the case of the first embodiment) may be carried out about a central and symmetric axis of rotation, as illustrated in the figures, in order to reduce vibration at high switching speeds. Alternatively, the axis of rotation may be established more closely towards either reflective (or refractive) surface of the device, or anywhere else. The invention will work so long as the relative position of the reflective or refractive surfaces remains constant during rotation and the clear apertures of the optical surfaces are adequate to pass the desired beams.

Figure 9:
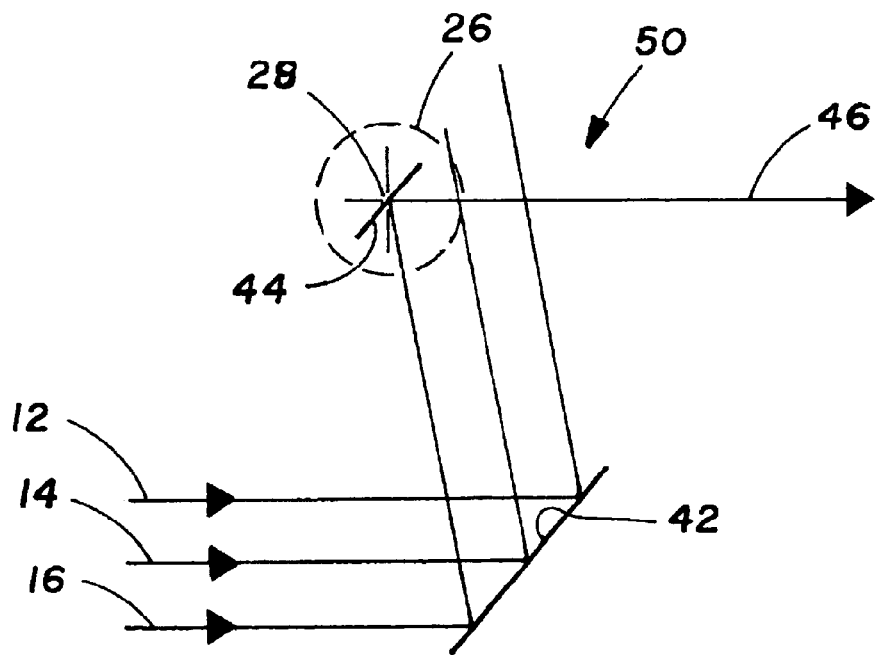
FIG. 9 is a schematic illustration of an optical switch according to the invention that utilizes two parallel mirrors mounted on a rotating fixture wherein the second mirror is reduced in size to substantially capture a single light beam reflected from the first mirror, thereby eliminating the need for an aperture in the optical path of the switch's output.
Figure 10:
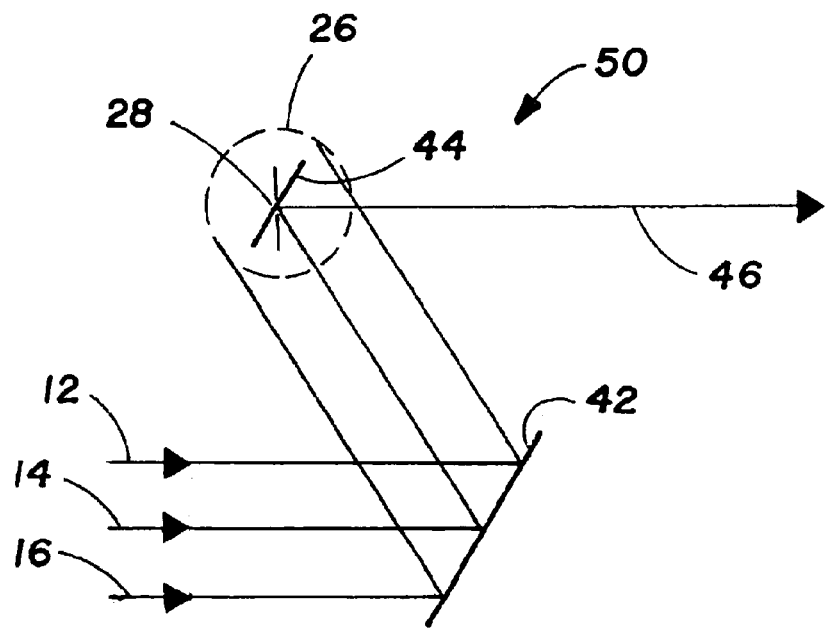
FIGS. 10 and 11 show different positions of the mirrors in the switch of FIG. 9 to illustrate the selection of different input beams to produce the output of the switch.
Figure 11:
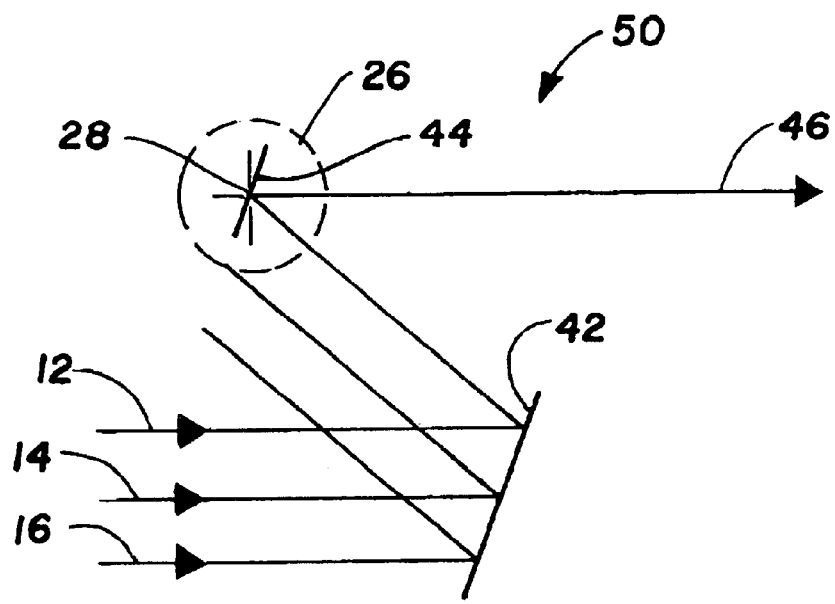
Figure 12:
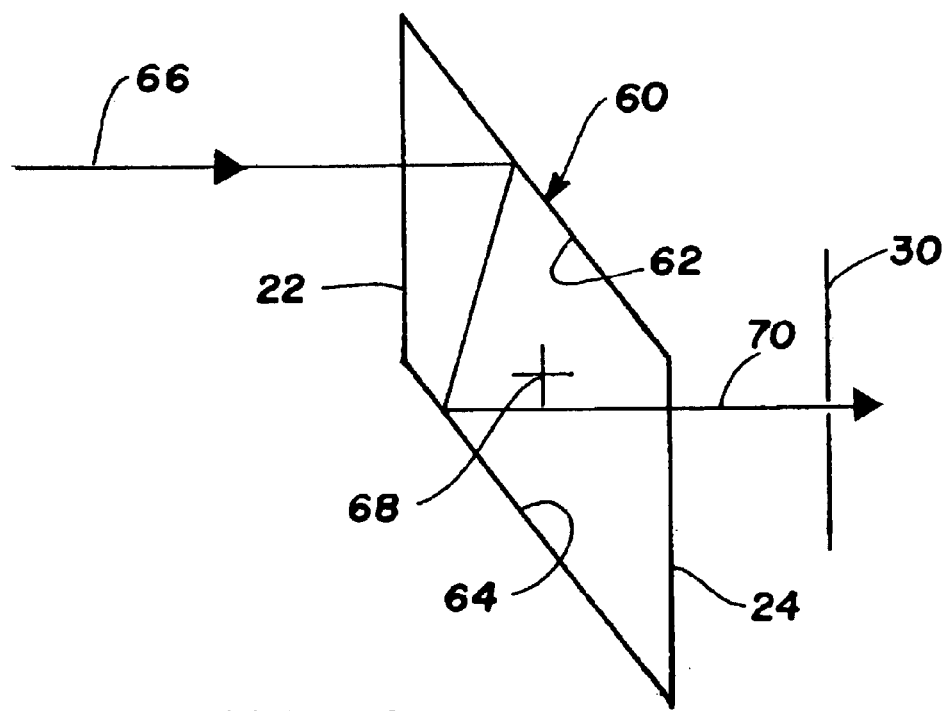
FIG. 12 is a schematic illustration of an optical switch according to the invention that utilizes reflection in a transparent block mounted on a rotating fixture to determine the output of the switch by selectively shifting several incident light beams onto a fixed optical path through an aperture.
Figure 13:
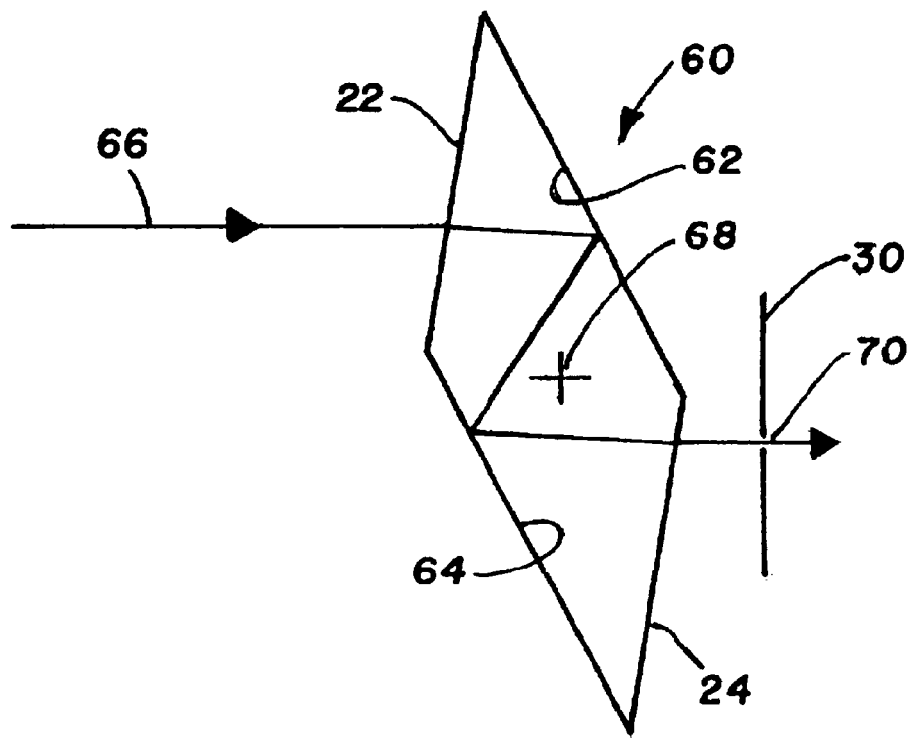
FIGS. 13–15 show different positions of the block in the switch of FIG. 12 to illustrate the selection of different input beams to produce the output of the switch.
Figure 14:
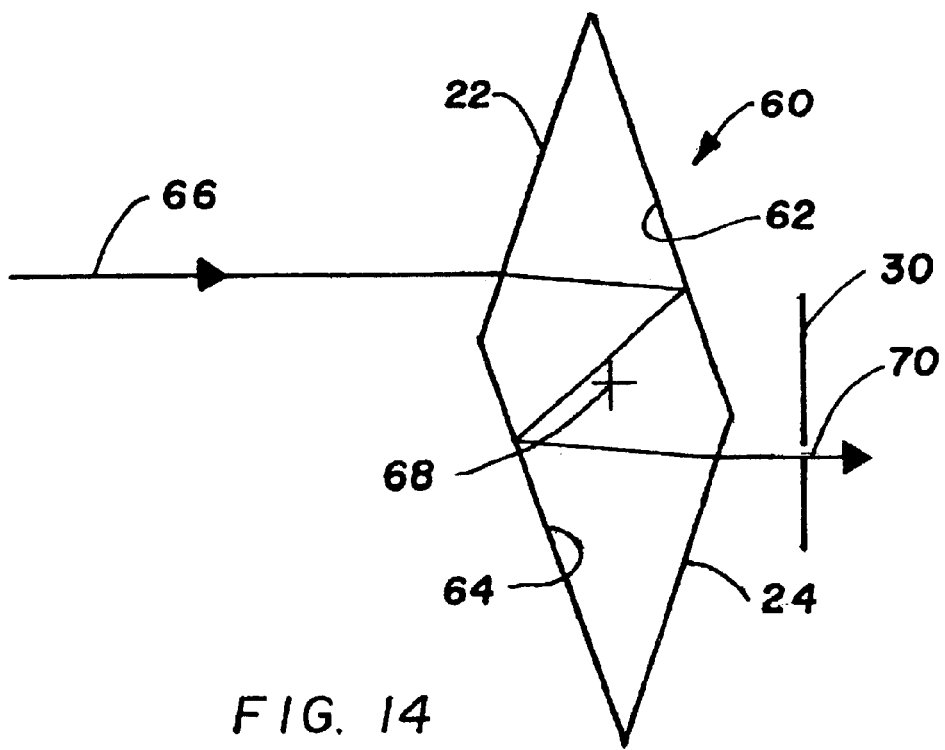
Figure 15:
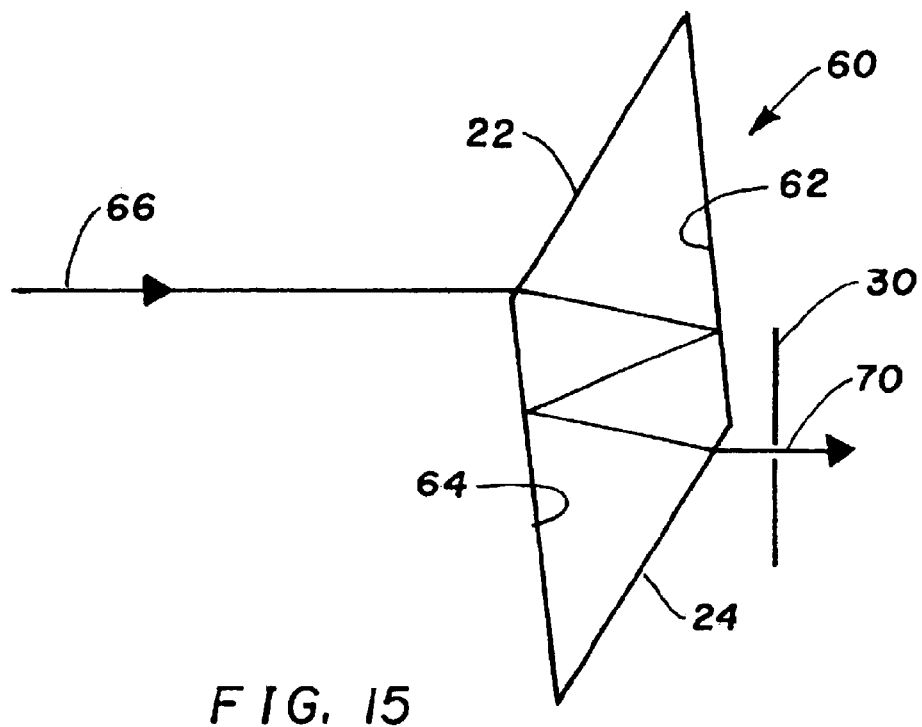
Figure 16:
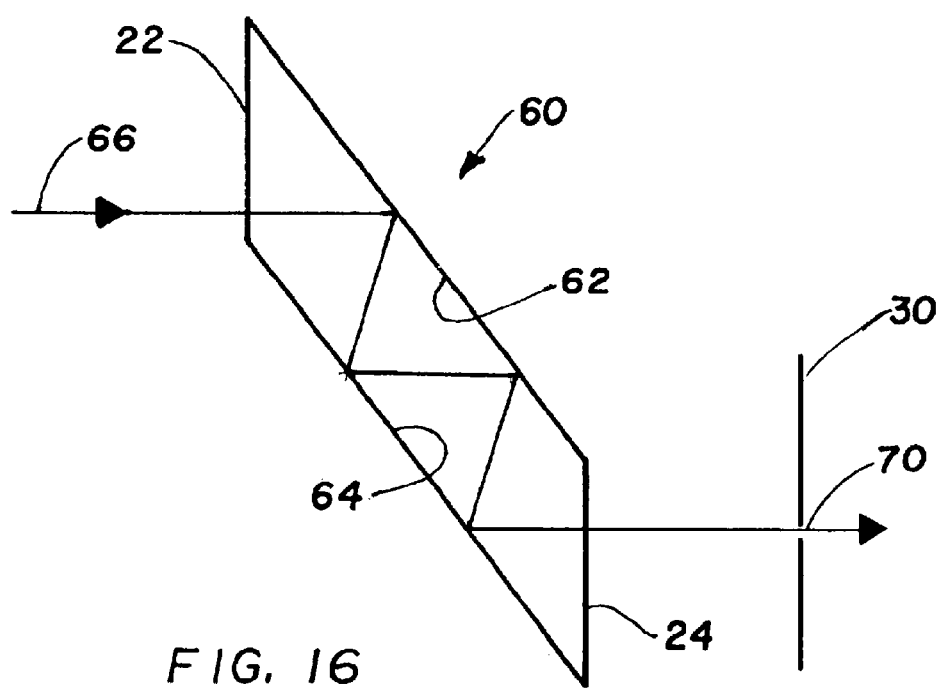
FIG. 16 is a schematic illustration of an optical switch according to the invention that utilizes reflection in a thin transparent block in order to reduce the mass of the switch and shift incident light beams through multiple reflections.
Figure 17:
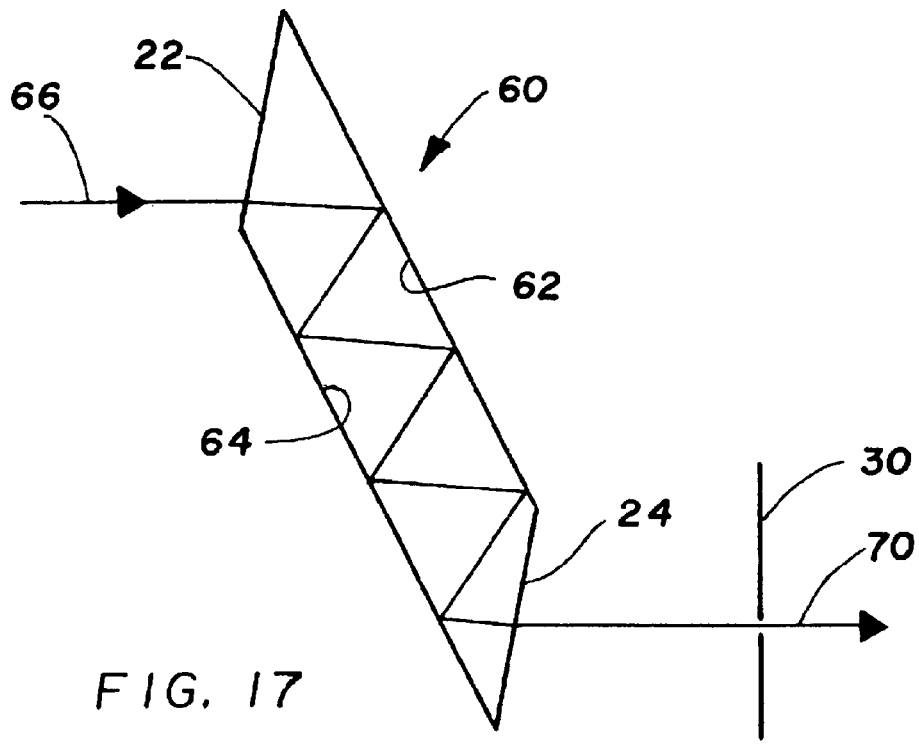
FIGS. 17–19 show different positions of the block in the switch of FIG. 16 to illustrate the selection of different input beams to produce the output of the switch.
Figure 18:
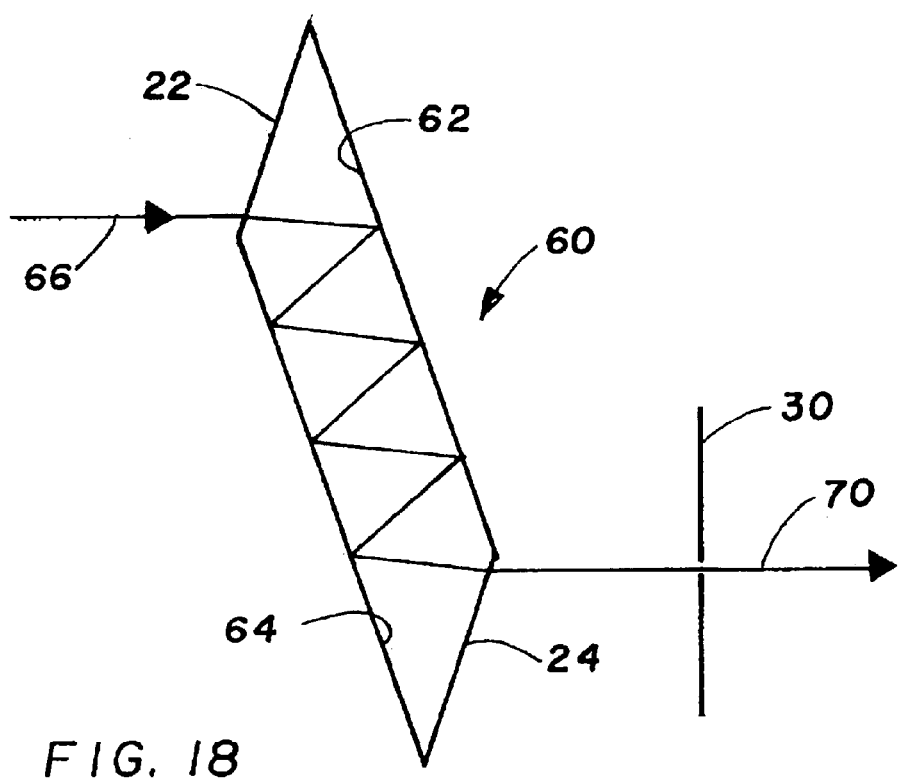
Figure 19:
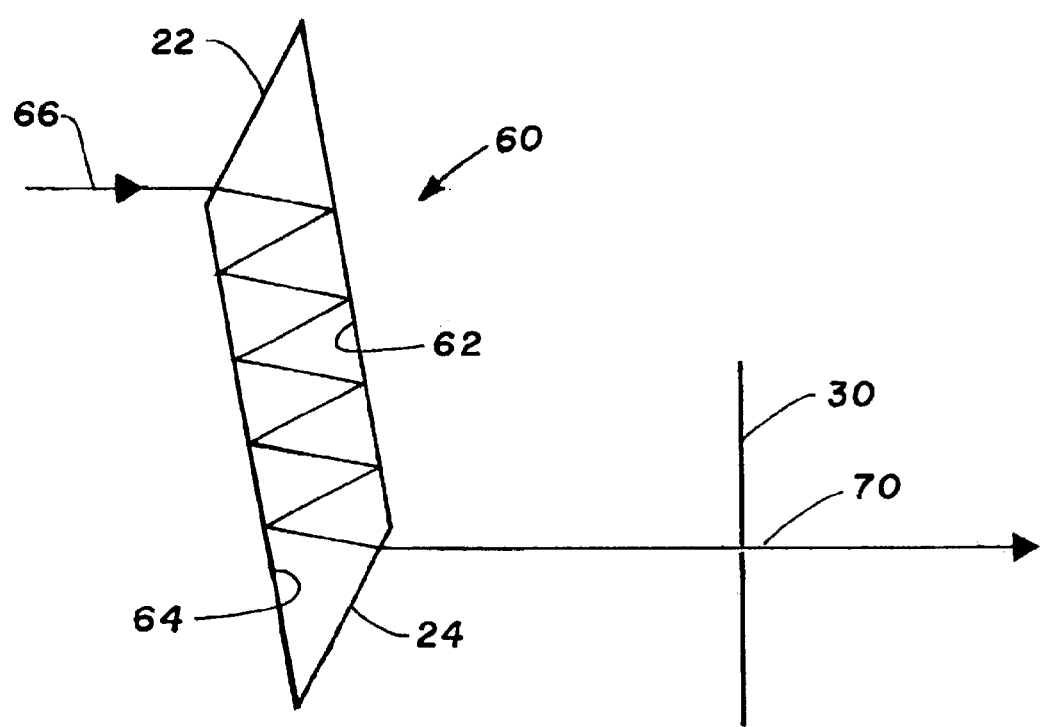

The function of the aperture 30 used to restrict the output of the switch of the invention to a single beam 32 (or 46) at a time can be implemented in the mirror embodiment by a careful choice of size and position of the second mirror 44. As illustrated in FIGS. 9–11, the size of the second mirror 44 of the switch 50 is selected such that it is capable of intersecting the reflection of only one input beam 12, 14, or 16 at a time, while the other reflections bypass the mirror 44 and are dispersed or otherwise channeled away from the optical path of the switch's output. As illustrated in FIG. 9, the reflections from undesired beams 12 and 14 are allowed to pass by the edges of the second mirror 44 and are absorbed behind it. As one skilled in the art would readily understand, as the size of the mirror 44 shrinks to approach the size of a single laser beam, its distance from the axis of rotation must be decreased to ensure that each input beam intersects it when it is to be directed into the system. Accordingly, the axis of rotation 28 of the fixture 26 is preferably placed along the reflective surface 44, as shown in the drawings. Thus, the output beam 46 generated by the switch 50 is determined by the precise alignment of the mirror 44 with the first reflection of a single input beam 12, 14 or 16, which is determined by the degree of rotation of the fixture 26. FIGS. 10 and 11 illustrate alternative rotational positions that produce an output beam 46 corresponding to input beams 14 and 12, respectively.

The mirror embodiment of the invention may be implemented also by placing reflective surfaces on a solid block of glass and causing the input beams to enter a first surface, reflect internally through the block, and emerge from a second opposing surface. As illustrated with a rhombic polyhedron in FIGS. 12–15, wherein only the glass block and a single light wavefront are shown, the transparent entrance and exit surfaces 22, 24 of the glass block 60 are bound by surfaces 62, 64 coated with reflective coatings in order to produce reflection of any beam of interest 66 incident to the entrance surface 22. As illustrated by the sequence of positions of FIGS. 12–15 produced by the rotation of the block 60 around a predetermined axis 68, the output beam 70 emerging from the exit surface 24 at a fixed location corresponds to different parallel positions of the input beam 66 incident to the entrance surface 22. Accordingly, the reflective coated surfaces of a glass block may be used in equivalent fashion to manufacture an optical switch according to the invention. It is noted that in this and all other embodiments of the invention that employ reflection, total internal reflection at uncoated glass/air interfaces may also be used advantageously if the reflection angles are suitable. Other materials such as optical plastics may be utilized as alternatives to glass.

This implementation of the invention has the advantage that the parallelism between the two mirror faces 62,64 is held by a single component, rather than by a setup of two discrete mirrors. On the other hand, it also produces refraction at the entrance and exit faces 22,24 of the glass block 60, which needs to be accounted for in the design of the switch. With a careful choice of dimensions, multiple reflections within the glass block 60 can be used to reduce its size, as illustrated in the sequence of FIGS. 16–19, where the lateral shift of a single beam is shown.

Yet another implementation of the invention may be accomplished with a rotating penta-prism which includes a 90-degree bend (a so-called 45-degree-roof prism). As illustrated in the sequence of FIGS. 20–23, wherein the light beams are shown entering from the bottom and exiting toward the left of the drawings, this embodiment of the invention produces a 90-degree bend as well as a translation in the optical path of the light as a function of rotation of the penta-prism 72. An input light beam 74 directed to the first refractive surface 76 of the penta-prism is refracted toward and reflected internally by a first reflective surface 78, reflected again by a second reflective surface 80, and finally refracted by the second refractive surface 82 to produce an output beam 84 along a predetermined optical path.

Figure 20:
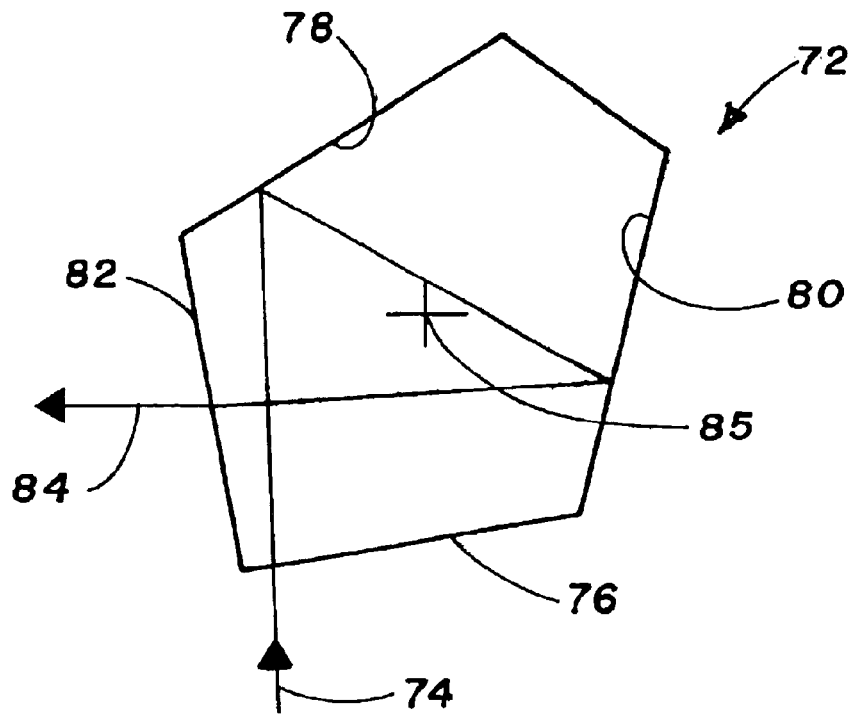
FIG. 20 is a schematic illustration of an optical switch according to the invention that utilizes reflection in a 45-degree-roof penta-prism to produce a shift and a 90-degree bend of incident light beams through multiple reflections.
Figure 21:
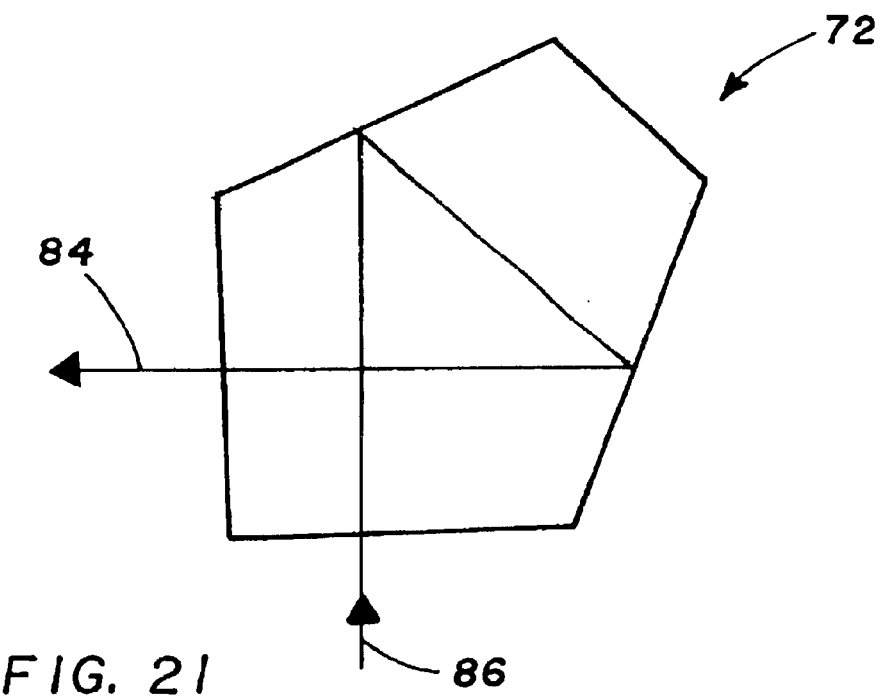
FIGS. 21–23 show different positions of the block in the switch of FIG. 20 to illustrate the selection of different input beams to produce the output of the switch.
Figure 22:
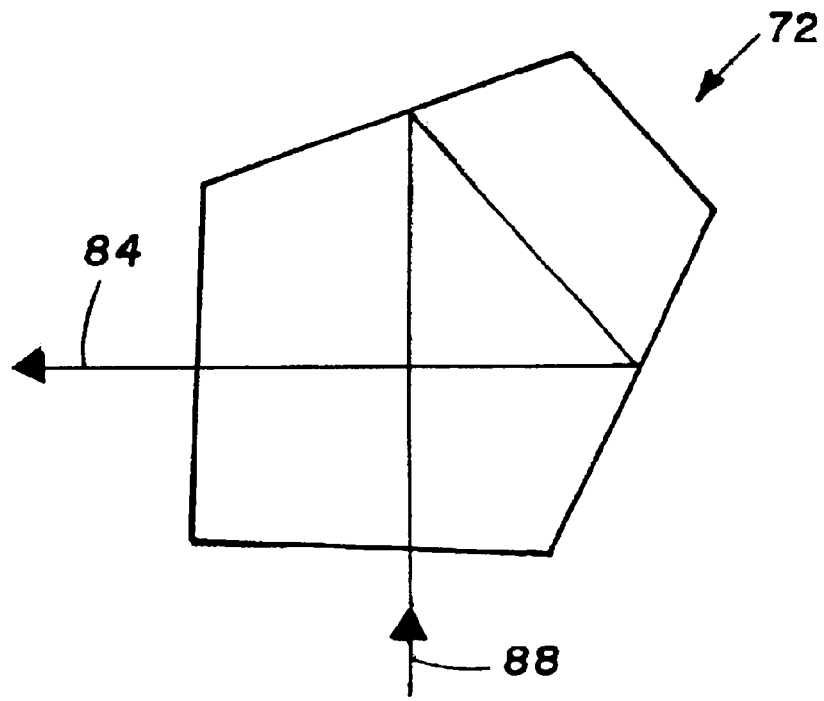
Figure 23:
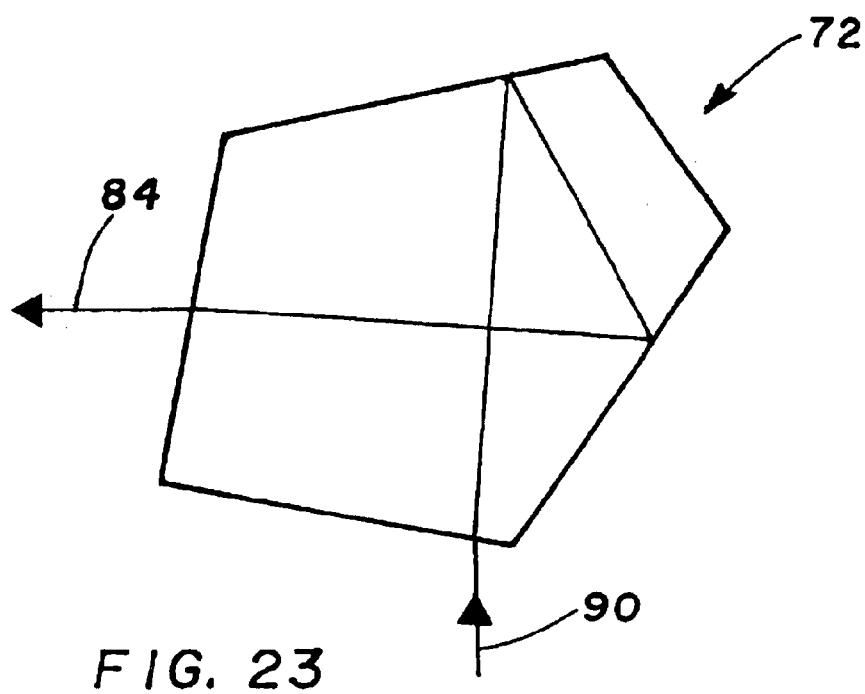
Figure 24:
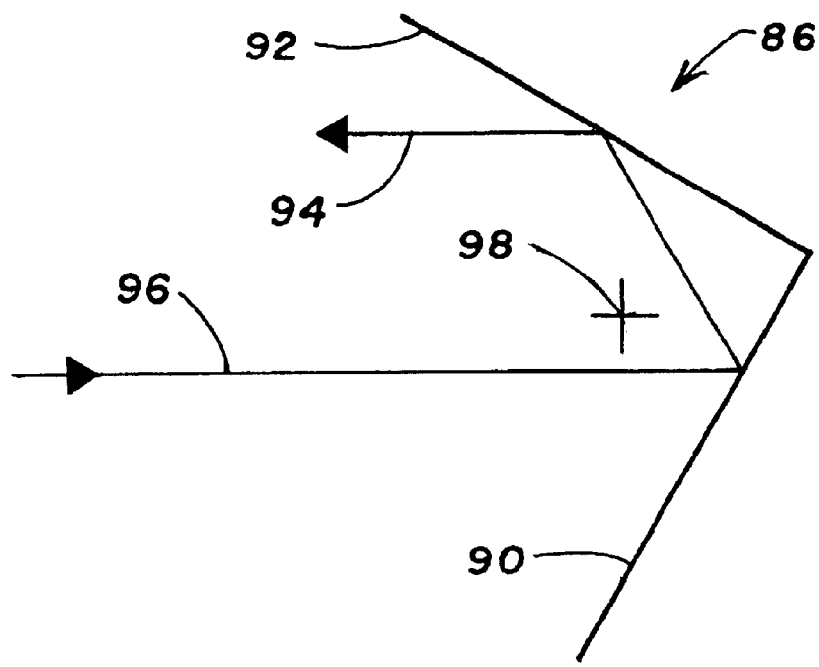
FIG. 24 is a schematic illustration of an optical switch according to the invention that utilizes reflection in a 90-degree roof to produce a shift and a 180-degree bend of incident light beams through multiple reflections.
Figure 25:
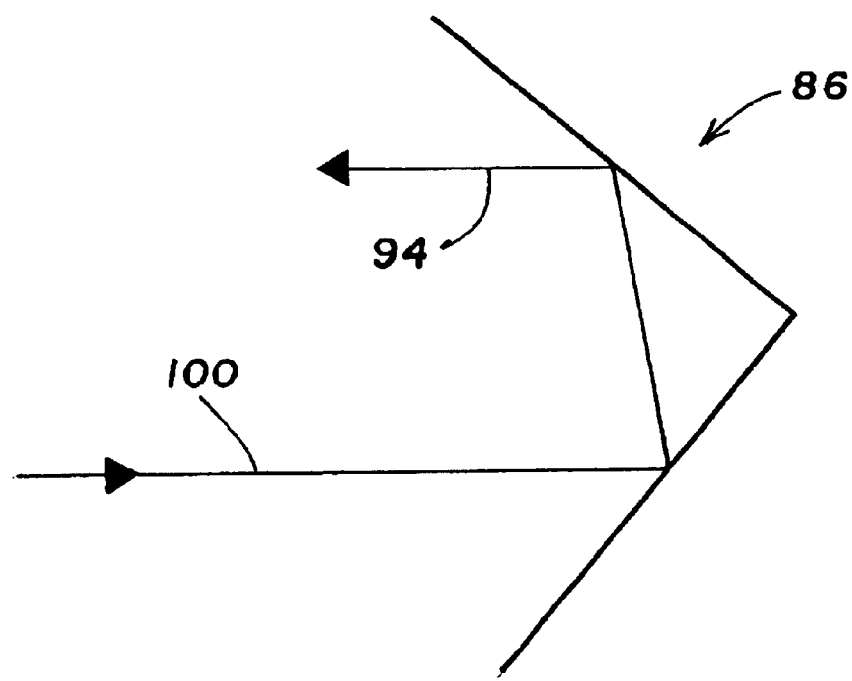
FIGS. 25–27 show different positions of the block in the switch of FIG. 24 to illustrate the selection of different input beams to produce the output of the switch.
Figure 26:
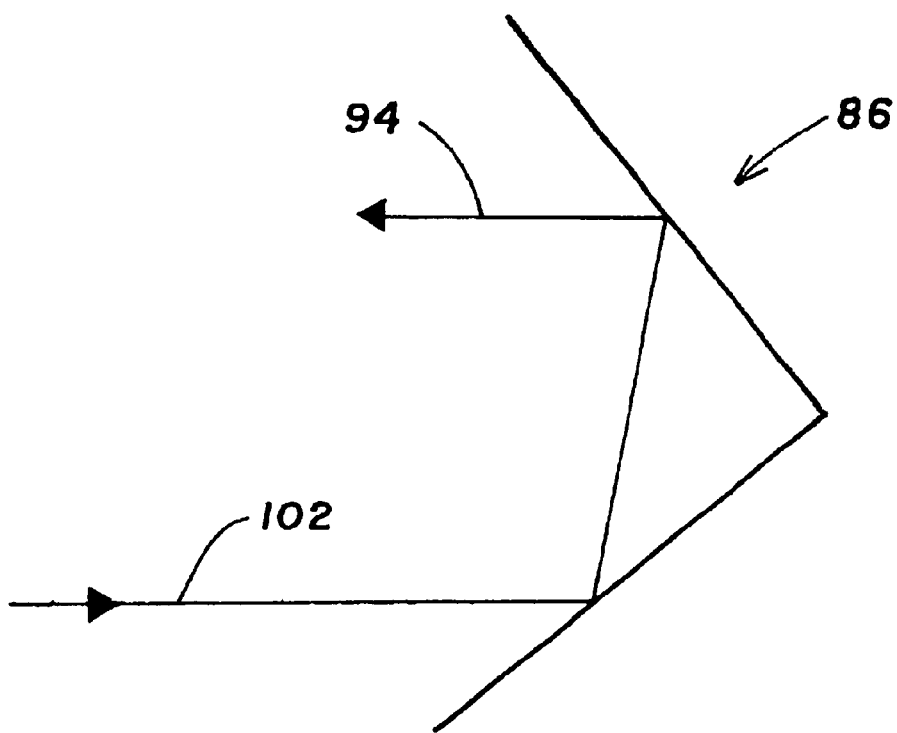
Figure 27:
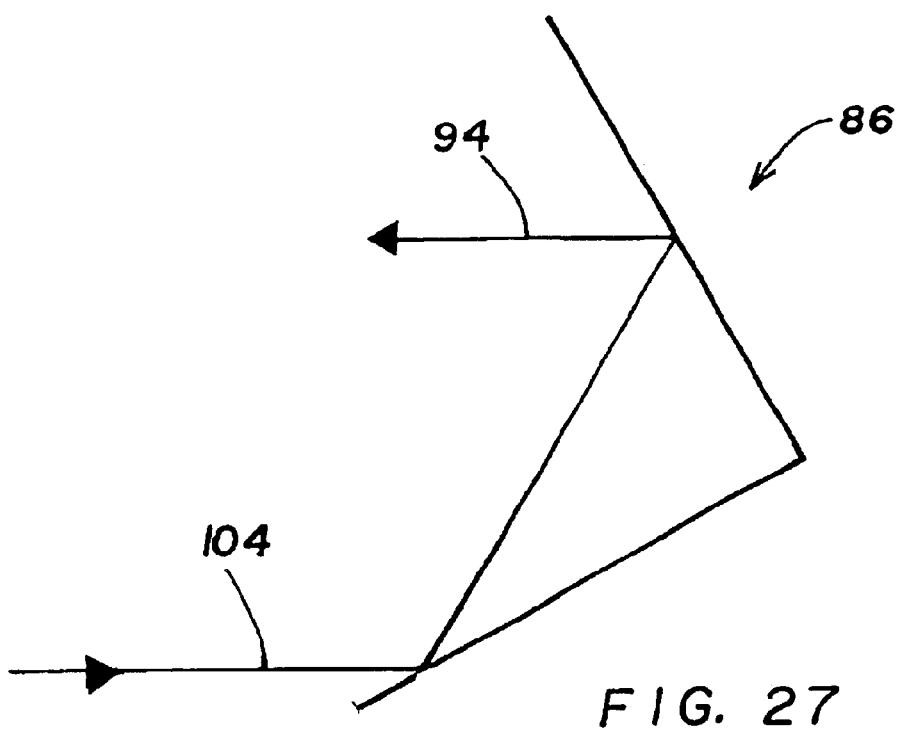

As is well understood in the art, the optical path of the output beam 84 will be at a 90-degree angle with respect to the incoming beam 74 so long as the two internally reflective surfaces 78, 80 are at a 45-degree angle. If not, the angle between the input and output beams will vary accordingly. The axis of rotation 85 of the penta-prism is illustrated in FIG. 20 at the centroid point of the structure, but in practice it can be in any position that does not produce obscuration of the beams. FIGS. 20–23 illustrate the constant optical path of the output beam 84 produced by switching among alternative parallel input beams 74, 86, 88, 90 as a result of the rotation of the penta-prism 72. It is noted that a 45-degree roof can also consist of a pair of reflective surfaces in air. In this case, surfaces 76 and 82 in the figures would not be present and no refraction would occur.

A similar implementation of the invention is produced by a rotating right-angle prism or mirror pair which includes a 90-degree bend (a so-called 90-degree roof). This embodiment of the invention produces a 180-degree bend as well as a translation in the optical path of the light as a function of rotation of the right-angle prism 72. Two reflective surfaces 90, 92 disposed at right angle produce a 180-degree bend and a shift as a function of the rotation of the 90-degree roof. Again, the optical path of the output beam 94 will be at a 180-degree angle with respect to the incoming beam 96 so long as the two reflective surfaces 90, 92 are at a 90-degree angle. If not, the angle between the input and output beams will vary accordingly. As above, the placement of the axis of rotation 98 is not critical so long as obscuration of the beams is avoided. FIGS. 24–27 illustrate the constant optical path of the output beam 94 produced by switching among alternative parallel input beams 96, 100, 102, 104.

As one skilled in the art would readily understand, other mirror and/or refractive-surface configurations can be used to produce beam translation in two directions without loss of parallelism. For example, a three-mirror "cube corner" would produce a 180-degree bend in the same manner as the 90-degree roof with rotation of the cube corner about any axis displacing the beam laterally but not angularly (the 45- and 90-degree roofs provide directional insensitivity to rotation about only two axes). Therefore, it is clear that the invention is not intended to be limited to the configurations expressly described herein.

It is noted that in all embodiments the optical beam is translated by undergoing two or more successive reflections and/or refractions. The initial reflection or refraction causes the beam to be diverted into a new direction, which produces the desired translation that is at the essence of the invention. The final reflection or refraction may restore the beam to its original direction, depending on the parallelism between the various surfaces. In all cases, though, between the initial and final changes in the directions of propagation, the beam propagates some distance in a new direction, producing the desired lateral translation. The length of this intermediate path, in conjunction with its angle with the original and final propagation directions, determines the amount of lateral translation of the beam. Intermediate reflections serve to reduce the size of the device for practical reasons, but do not change the fundamental operation. Intermediate refractions are not currently foreseen, but may serve a future purpose. In general, all the beams are translated simultaneously, such that only a single beam is placed onto the desired output axis, and an aperture after the device or an equivalent solution is used to block or disperse all but the desired beam.

Figure 28:
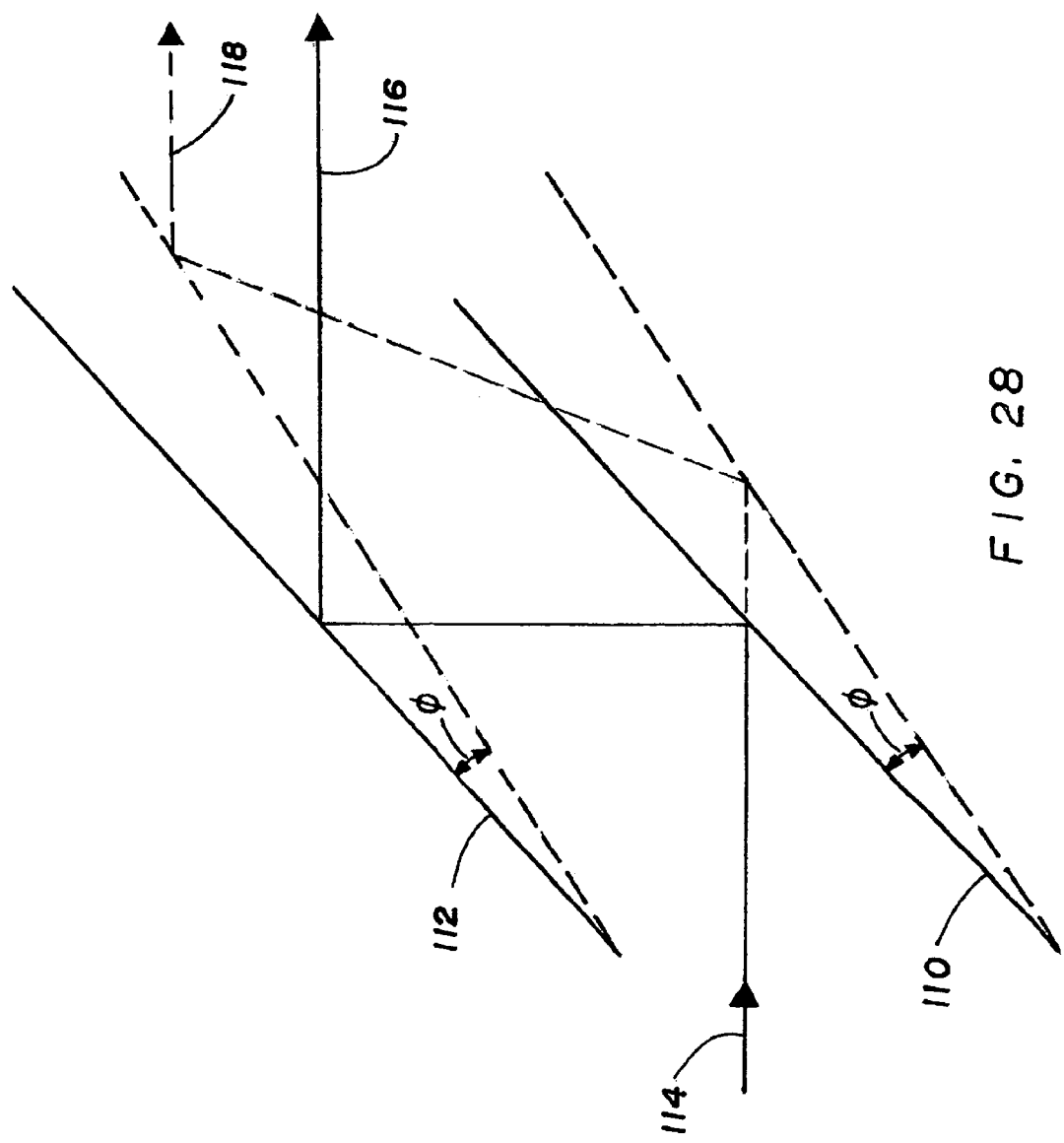
FIG. 28 is an alternative embodiment of the invention wherein two reflective surfaces are independently hinged and rotated maintaining the angular relation between the surfaces.

It is understood that many equivalent mirror and block structures are possible within the scope of the present invention and that those skilled in the art could easily design a special system for a specific application. For example, FIG. 28 illustrates a system wherein two reflective surfaces 110, 112 are used to shift an input beam 114 laterally over a parallel path to produce an output beam 116. The drawing clearly shows that the independent rotation of each mirror 110, 112 by an angle φ will vary the degree by which the input beam 114 is shifted (see beam 118). In view of this disclosure, those skilled in the art would readily understand that the direction of the output beam will remain parallel to the original one (116), but shifted, so long as the two mirrors 110, 112 are rotated by the same amount. Thus, this property can also be exploited advantageously, in reverse, to produce a switch according to the invention.

Figure 29:
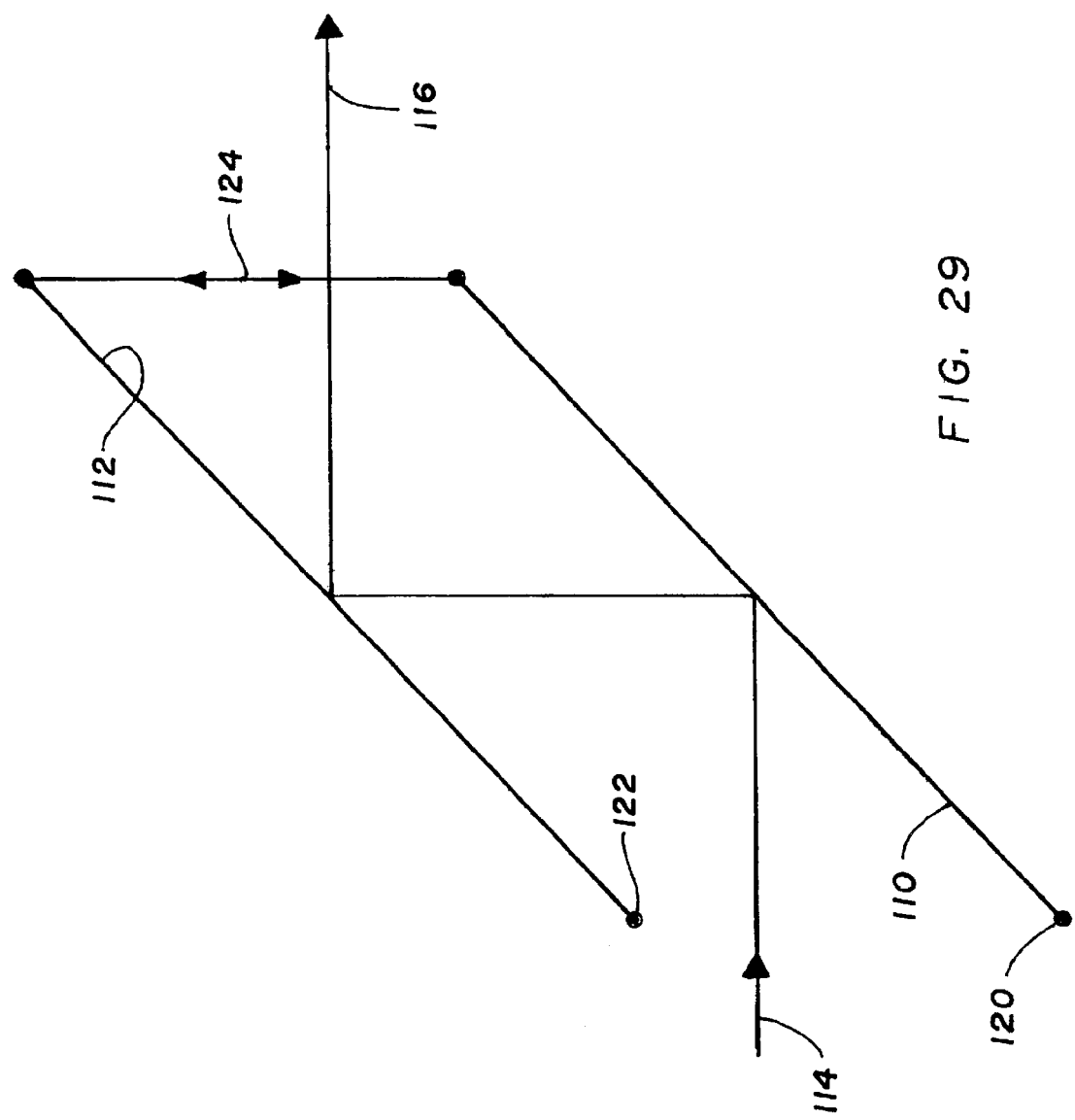
FIG. 29 is a schematic illustration of a practical way to implement the concept of FIG. 28.

FIG. 29 shows a set-up wherein two mirrors 110, 112 are hinged at fixed pivot points 120, 122, respectively, and connected by an actuating mechanism 124 adapted to cause their rotation maintaining the relative angle between the mirrors (the two mirrors are shown parallel in the figure but any fixed relation would be suitable to practice the invention). Thus, as the mechanism 124 moves in either direction, as illustrated by the arrows in the figure, the position of both mirrors changes by the same angular rotation and the beam 114 is shifted by different amounts in function of the mirrors' position.

These devices are characterized by the need to rotate widely-spaced or fairly-massive components to accomplish the desired beam translation. Galvanometers that can rotate a glass plate (typically mirrored on one side) rapidly are readily available (the speed of the rotating component in a galvanometer is limited by the size of the glass plate and its moment of inertia). Thus, another way to implement the present invention is to utilize a transparent plate suitable for use in a galvanometer as the medium through which the switch is implemented. As in the implementation illustrated in FIGS. 12–19, parallel input beams enter at one end of the plate and reflect back and forth across the faces until they exit at the other end. As would be clear to one skilled in the art, this galvanometer design may require the incoming parallel beams to be placed along a curved surface in order to account for the rotation of the plate.

In a more general implementation of any embodiment of the invention, the mirrors (or refractive surfaces) do not have to be parallel to each other or to the axis of rotation. The only general requirement is that the beam deviating surfaces do not degrade the wavefront and are suitably positionable. In the case where the mirrors are not parallel to each other or to the rotation axis, the angle and position of each incoming beam needs to be set at a correct combination of angle and position for it to exit the device at the correct angle and position when the switch selects the beam. While the use of non-parallel incoming beams may reduce the cost and complexity of the switch, it prevents the use of a general setup for all types of lasers in an external fixture (because each system is different), thereby impacting system manufacturability. Non-parallel incoming beams can also be accommodated by moving the mirrors independently of each other and with several degrees of freedom.

Finally, while the emphasis of this invention is on the selection of one among more input beams to be directed along an output path, it can similarly be employed for the controlled modification of a single beam. For example, a set of pairs of powered (curved) mirrors can be used to select between several beam magnifications or demagnifications to expand or compress, respectively, the input laser beam to a system to effect a change in the functional performance, such as resolution, of the system. Alternately, a set of on-axis or off-axis positions of lenses can be used as a form of zooming afocal telescope to obtain the same effect.

Thus, various changes in the details and steps that have been described may be made by those skilled in the art within the principles and scope of the invention herein illustrated and defined in the appended claims. While the invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

We claim:

1. An optical device for producing an output beam selected from a plurality of substantially parallel light beams, comprising:
   a first reflective surface positioned so as to receive said plurality of substantially parallel light beams;
   a second reflective surface positioned in fixed relation to the first reflective surface so as to receive and reflect said plurality of substantially parallel light beams after reflection from the first reflective surface;
   means for permitting passage of a single output beam propagating along an optical axis from said second reflective surface; and
   means for rotating the first and second reflective surfaces in fixed relation therebetween.

2. The switch of claim 1, wherein said optical axis is parallel to the substantially parallel light beams.

3. The switch of claim 1, wherein said means for permitting passage of a single output beam comprises an aperture.

4. The switch of claim 1, wherein said means for permitting passage of a single output beam comprises a second reflective surface that is only sufficiently large to reflect a single light beam at a time.

5. The switch of claim 1, wherein said first and second reflective surfaces are disposed in a 45-degree-roof configuration.

6. The switch of claim 1, wherein said first and second reflective surfaces are disposed in a 90-degree-roof configuration.

7. An optical device for producing an output beam selected from a plurality of substantially parallel light beams, comprising:
   a transparent block with an incident refractive surface and an emergent refractive surface, said incident refractive surface being positioned so as to receive said plurality of substantially parallel light beams;
   means for permitting passage of a single output beam along an optical axis emerging from said emergent refractive surface of the block; and
   means for rotating the block and said incident and emergent refractive surfaces in fixed relation therebetween.

8. The switch of claim 7, wherein said block further comprises additional surfaces coated with a reflective coating to produce reflection of light.

9. The switch of claim 7, wherein said block is a plane parallel plate.

10. The switch of claim 7, wherein said optical axis is parallel to the substantially parallel light beams.

11. The switch of claim 7, wherein said block is a penta-prism.

12. The switch of claim 7, wherein said block is a right-angle prism.

13. An optical device for producing an output beam selected from a plurality of substantially parallel light beams, comprising:
   a first direction-altering element positioned so as to receive said plurality of substantially parallel light beams;
   a second direction-altering element positioned in fixed relation to the first direction-altering element so as to receive and shift a direction of said plurality of substantially parallel light beams after propagation from the first direction-altering element;
   means for permitting passage of a single output beam propagating along an optical axis from said second direction-altering element; and
   means for rotating the first and second direction-altering elements in fixed relation therebetween.

14. The switch of claim 13, wherein said optical axis is parallel to the substantially parallel light beams.

15. The switch of claim 13, wherein said means for permitting passage of a single output beam comprises an aperture.

16. An optical device for producing an output beam selected from a plurality of substantially parallel light beams, comprising:
   a first reflective surface hinged on a first pivot point and positioned so as to receive said plurality of substantially parallel light beams;
   a second reflective surface hinged on a second pivot point and positioned in predetermined relation to the first reflective surface so as to receive and reflect said plurality of substantially parallel light beams after reflection from the first reflective surface;
   means for permitting passage of a single output beam along an optical axis emerging from said second reflective surface; and
   means for rotating the first and second reflective surfaces about said first and second pivot points, respectively, in fixed angular relation therebetween.

17. The switch of claim 16, wherein said optical axis is parallel to the substantially parallel light beams.

18. The switch of claim 16, wherein said means for permitting passage of a single output beam comprises an aperture.

19. A method for switching an output beam among a plurality of substantially parallel input light beams, comprising the following steps:
   positioning a first direction-altering element so as to receive said plurality of substantially parallel light beams;
   positioning a second direction-altering element in fixed relation to the first direction-altering element so as to receive and shift in direction said plurality of substantially parallel light beams after propagation from the first direction-altering element;
   permitting passage of a single output beam propagating along an optical axis from said second direction-altering element; and
   rotating the first and second direction-altering elements in fixed relation therebetween in order to switch the output among said plurality of substantially parallel input light beams.

20. The method of claim 19, wherein said optical axis is parallel to the substantially parallel input light beams.

21. The method of claim 19, wherein said step of permitting passage of a single output beam is accomplished using an aperture.

* * * * *